United States Patent
Amir et al.

(10) Patent No.: US 7,920,761 B2
(45) Date of Patent: *Apr. 5, 2011

(54) MULTIMODAL IDENTIFICATION AND TRACKING OF SPEAKERS IN VIDEO

(75) Inventors: Arnon Amir, Saratoga, CA (US); Giridharan Iyengar, Nanuet, NY (US); Ran D. Zilca, Briarcliff Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 404 days.

This patent is subject to a terminal disclaimer.

(21) Appl. No.: 12/118,809

(22) Filed: May 12, 2008

(65) Prior Publication Data

US 2008/0247650 A1    Oct. 9, 2008

Related U.S. Application Data

(63) Continuation of application No. 11/465,926, filed on Aug. 21, 2006, now abandoned.

(51) Int. Cl.
*G06K 9/54* (2006.01)
(52) U.S. Cl. ........ 382/305; 382/284; 382/286; 382/294; 382/307; 715/716; 715/719; 715/720; 715/722; 715/723; 725/32; 725/37
(58) Field of Classification Search .................. 382/305, 382/284, 286, 294, 307; 715/716, 719, 720, 715/722, 723; 725/32, 37
See application file for complete search history.

(56) References Cited

U.S. PATENT DOCUMENTS

| | | | |
|---|---|---|---|
| 4,449,189 A | 5/1984 | Feix et al. | |
| 5,625,704 A | 4/1997 | Prasad | |
| 6,317,716 B1 | 11/2001 | Braida et al. | |
| 2003/0198256 A1 | 10/2003 | Wang et al. | |
| 2005/0047664 A1* | 3/2005 | Nefian et al. | 382/228 |
| 2006/0059120 A1* | 3/2006 | Xiong et al. | 707/3 |
| 2006/0204060 A1 | 9/2006 | Huang et al. | |

OTHER PUBLICATIONS

C. Neti, G. Potamianos, J. Leuttin, I. Matthews, H. Glotin, D. Vergyri, J. Sisson, A. Mashari, and J. Zhou, "Audio-visual speech recognition," CLSP Summer Workshop Tech. Rep. WS00AVSR, Johns-Hopkins University, Baltimore, MD, 2000.

John Hershey and Javier Movellan, "Using audio-visual synchrony to locate sounds," in Proc. NIPS, 1999. www.cs.cmu.edu/Groups/NIPS/NIPS99/99papers-pub-on-web/Named-gz/HersheyMovellan.ps.gz.

John W. fisher, Trevor Darrell, William Freeman and Paul Viola, "Learning Joint Statistical Models for Audio-Visual Fusion and Segregation", Advances in Neural Information Processing Systems, Denver, Colorado, Nov. 28-Dec. 2, 2000.

Iyengar, G. Nock, H.J. Neti, C., "Audio-visual synchrony for detection of monologues in video archives", ICME 2003.

(Continued)

*Primary Examiner* — Mike Rahmjoo
(74) *Attorney, Agent, or Firm* — Cantor Colburn LLP; Ann Dougherty

(57) ABSTRACT

A computer program product includes machine readable instructions for providing enhanced video output by: receiving footage including likeness information in a plurality of modalities; demultiplexing the plurality of modalities to provide information for each modality; comparing information from at least two of the modalities for determining a correlation in the likeness information; using the correlation, obtaining semantic information for association with the likeness; and combining the semantic information with the likeness information for providing the enhanced video output. A system for implementing the computer program product includes resources for receiving the footage.

8 Claims, 6 Drawing Sheets

OTHER PUBLICATIONS

A. Smeaton, P. Over and W. Kraaij, "TRECVID: evaluating the effectiveness of information retrieval tasks on digital video", Proceedings of the 12th annual ACM international conference on Multimedia, pp. 652-655, 2004, ISBN:1-58113-893-8.

Martin, A., and M. Przybocki. 2000. The NIST 1999 speaker recognition evaluation-An overview, Digital Signal Processing vol. 10, pp. 1-18.

Face Detection: A Survey, Erik Hjelm, Computer Vision and Image Understanding 83, 236-274 (2001).

* cited by examiner

MULTIMODAL IDENTIFICATION AND TRACKING OF SPEAKERS IN VIDEO

CROSS REFERENCE TO RELATED APPLICATION

This application is a continuation application of U.S. Ser. No. 11/465,926, filed Aug. 21, 2006, the contents of which are incorporated by reference herein in their entirety.

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND OF THE INVENTION

1. Field of the Invention

This invention relates to video presentations and more particularly to an association of semantic data with individual speakers.

2. Description of the Related Art

In many video presentations, individuals provide up close and personal interviews. Frequently, editors of the video presentation couple presentations of semantic information with a graphic display of the interview. Examples include the addition of semantic information about the person, such as the person's name and affiliation, sports team membership, political party affiliation and other such information. To avoid confusion of a viewer, such personal information should only appear while that person is visible.

Present day techniques for adding semantic information typically involve editing of footage with manual entry of the semantic information. As one might imagine, such techniques involve various production resources and unfortunately take time. With increasing competition for audiences as well as demand for fresh material, producers would find great value in elimination of manual techniques for addition of semantic information.

Although some attempts have been made in the past to provide for improved production systems, these have fallen short of providing users with satisfactory results. For example, systems that rely on auditory recognition alone have a variety of drawbacks. Consider the situation where multiple speakers provide a dialog while only one speaker appears in the display. At times, there could be situations where one face is shown while another person speaks. Such is the case with interviews and panel discussions. Hence displaying personal information of the speaker with the face of another person would be confusing if not misleading.

What are needed are techniques for combining semantic information with a video presentation, where the combining is completed in an expedient manner, such as without a requirement for manual production.

SUMMARY OF THE INVENTION

The shortcomings of the prior art are overcome and additional advantages are provided through the provision of a computer program product including machine readable instructions stored on machine readable media, the instructions for providing enhanced video output by: receiving footage including likeness information in a plurality of modalities; demultiplexing the plurality of modalities to provide information for each modality; identifying a likeness using information from a first modality; comparing the likeness with information from another modality and determining a correlation between the likeness and the information from another modality; tracking the likeness using information from one of the first modality and the another modality; obtaining semantic information for association with the likeness; and associating the semantic information with the likeness for providing the enhanced video output.

A system for providing enhanced video output, the system including: resources for receiving footage, and for implementing a computer program product including machine readable instructions stored on machine readable media, the instructions for providing enhanced video output by: receiving footage including likeness information in a plurality of modalities; demultiplexing the plurality of modalities to provide information for each modality; identifying a likeness using information from a first modality; comparing the likeness with information from another modality and determining a correlation between the likeness and the information from another modality; tracking the likeness using information from one of the first modality and the another modality; obtaining semantic information for association with the likeness; and associating the semantic information with the likeness for providing the enhanced video output.

System and computer program products corresponding to the above-summarized methods are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

TECHNICAL EFFECTS

A computer program product including machine readable instructions stored on machine readable media, the instructions for providing enhanced video output by: receiving footage including likeness information in a plurality of modalities including at least one of a video modality, an audio modality, and a lip synchronization modality, the likeness information including appearance information including at least one of an auditory appearance and a visual appearance; demultiplexing the plurality of modalities to provide information for each modality; identifying a likeness using information from a first modality; comparing the likeness with information from another modality and determining a correlation between the likeness and the information from another modality; tracking the likeness using information from one of the first modality and the another modality; associating the semantic information with the likeness for providing the enhanced video output; wherein at least one of the demultiplexing and the comparing includes employing at least one of a speaker identification module including instructions for providing a speaker identification, a shot boundary detection module including instructions for providing at least one of a start time and an end time for the speaker, a face detection and tracking module including instructions for providing at least one of facial recognition, location determination and image tracking, and a lip-sync detector module including instructions for detecting a spatio-temporal relationship between voice and motion in the footage; obtaining semantic information for association with the likeness; the semantic information including at least one of personal information, a name, a player number, a political party and an employer identity for association with the likeness; and associating the semantic information with the likeness for providing the enhanced video output for a period of time that is one of longer and shorter than the correlation.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION OF THE INVENTION

Figure 1:
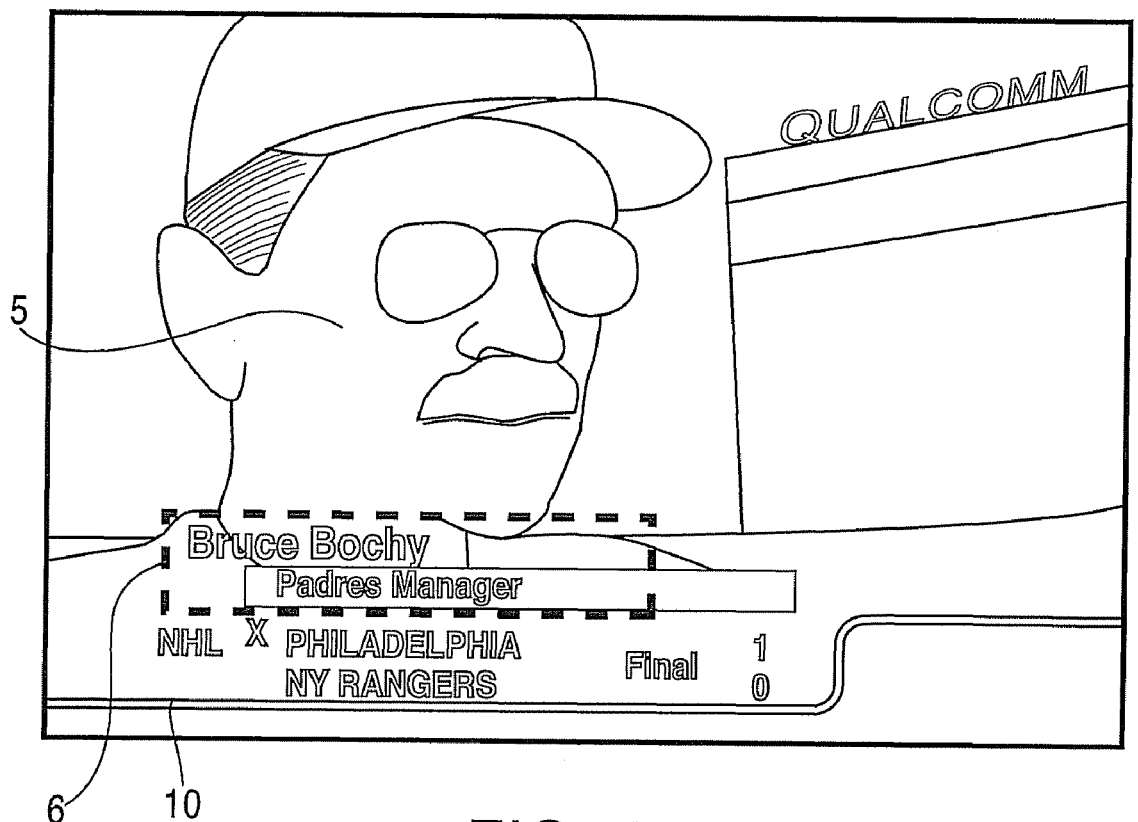
FIG. 1 illustrates one example of a speaker presented in a video display.

In many television (and other) video presentations, there are often text overlays providing descriptive information such as the name and title of a person speaking (i.e., a speaker). Reference may be had to FIG. 1 that provides a graphic display including a sports figure.

In FIG. 1, a video display (10) includes a likeness (5) that can be associated with an individual. The likeness (5) may include appearance information that is descriptive of a unique visual appearance as well as a unique auditory appearance. The unique types of appearance information are useful for distinguishing each person from another, where the distinguishing is required for sorting likenesses (5) appearing in the graphic display.

Also included in FIG. 1 is semantic information (6). The semantic information (6) typically includes personal information. Exemplary personal information includes name, player number, political party, employer identity and other such information. The semantic information (6) can be associated with the likeness (5) to provide for an enhanced video display (10).

For convention, video displays (10) having various signals, such as an auditory signal and a visual signal convey "multimodal information" or "modality information" for each of the modalities. That is, likeness information (5) is presented via various modalities.

As disclosed herein, when multimodal information is present in a video display (10), a recognition task may be performed. The teachings herein make use of a plurality of modalities conveying information for appropriately synchronizing semantic information (6) with a likeness (5).

As an example, the likeness (5) is derived from one modality (an auditory modality using speaker identification by voice signature), is compared with the likeness (5) for a second modality (a visual modality using the visual image). Once an agreement in the likeness (5) is determined, the semantic information (6) is associated with the likeness (5).

The association of semantic information (6) and the likeness (5) is propagated as determined to be appropriate (for example, as determined by an editor). In one embodiment, the association persists according to the persistence of one of the modalities (e.g., as long as a certain face appears in the video display (10)). By using identification in first modality for one period of time, and tracking in second modality for another period of time and providing association between the different modalities (for at least some period of time), a reliable association of semantic information (6) with the likeness (5) may be realized for at least one period of time in which identification in first modality is unavailable.

As stated above, one prior art approach uses recognition and tracking for one modality, such as in the visual modality (i.e., using face recognition and face tracking to propagate the person's identification). However, recognition and tracking in this manner is inherently met with limitations, such as those discussed above.

Another prior art technique uses multimodal recognition and tracking. However, when multimodal information is used, it usually requires simultaneous presence of all the modalities to allow recognition, or allows for recognition based on one modality but can only label the video (provide the association of semantic information (6) with the likeness (5))) for the duration that the recognition takes place.

The current teachings make use of two or more information modalities, and employs the information in novel ways. These modalities are illustrative and not limiting. Exemplary modalities include audio, video and text. Exemplary identification include speaker identification, face recognition and character recognition. Exemplary association between modalities include audio-visual lip synchronization (lip sync). In one embodiment, identification occurs using the first modality (audio), association is established with the second modality (video) using audio-visual lip sync, and tracking is provided for in the second modality (face tracking in video).

Further, the process presented herein may be extended to other domains where identification is performed using one modality (e.g., speaker identification by recognition of voice patterns) and tracking is performed using another modality (e.g., visual). At some point in the process, the two (or more) modalities are in agreement and an association is made between the likeness (5) and the semantic information (6).

Consider the following aspects of making associations in a video presentation. Typically, the displayed name is associated with the visible likeness (5), while the auditory appearance might belong at some period of time to another person (e.g., an anchor, or an interviewer). Hence using the auditory appearance (by application of speaker identification) alone is insufficient for identifying the visible face and presenting the person's title. In this example, the outcome would clearly be erroneous.

Among the advantages of the teachings herein are presentation to broadcasters with cost-effective techniques for inserting information as video text, replacing expensive manual input. By using various information modalities, such as speaker identification, face detection and lip-sync, a system, apparatus and method may be realized for detecting and tracking speakers (likenesses (5)) on screen and automatically placing their names (semantic information (6)) on the video text stream associated with the broadcast.

In one embodiment, speaker identification is used to identify the auditory appearance of a person. At the same time, face detection is employed to detect faces in the video and object tracking is used to track the face in the video. In this embodiment, the system further provides for testing lip sync between the voice and the face. When lip sync is determined, the likeness (5) is associated with the identity provided by the speaker identification. Using the (visual) tracking of the face, the association persists, even while the person is not talking, or when someone else is talking. Aspects of persistence may be managed for reliable presentation. Semantic information (6), which may be obtained using the said identity, may be inserted into the video at any time within the period of said tracking.

Figure 2:
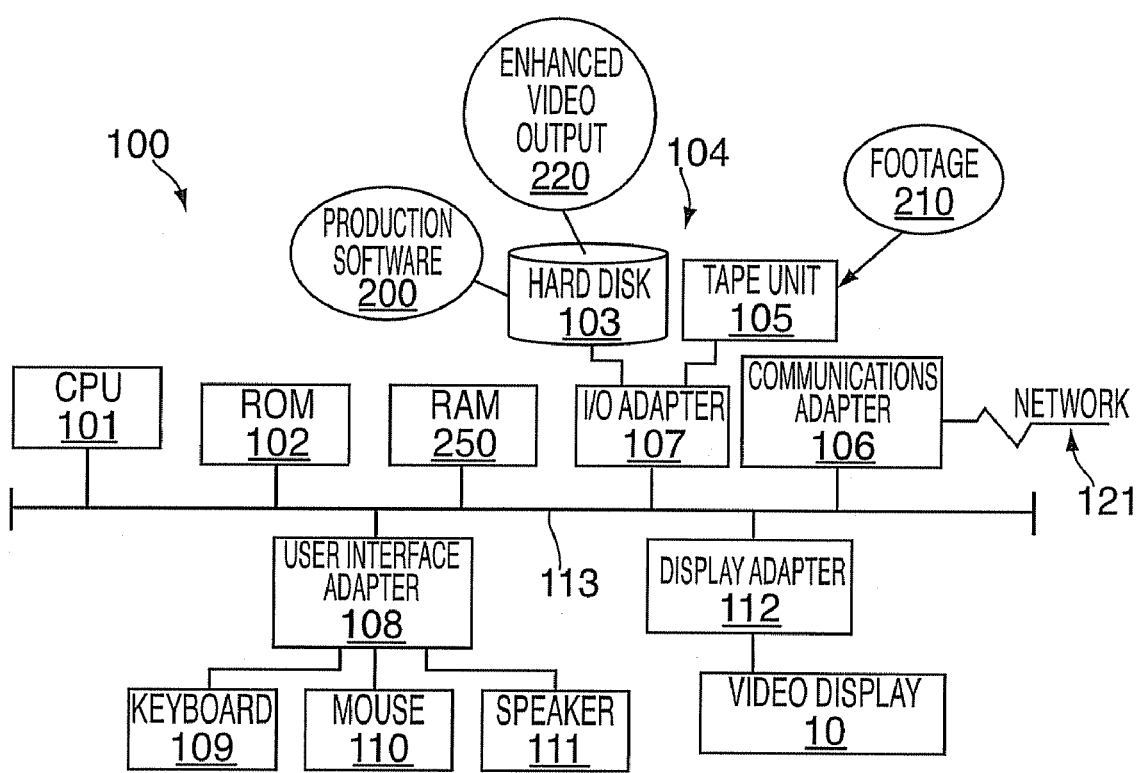
FIG. 2 illustrates one example of a production system for providing an enhanced video display.

Referring now to FIG. 2, there are shown apparatus for implementation of the teachings herein. In FIG. 2, an embodiment of a computer system (100) for implementation of the present teachings is depicted. In the exemplary embodiment, the system (100) includes a central processing unit (a processor) (101). The processor (101) is coupled to system memory (250) and various other components via a system bus (113). Read only memory (ROM) (102) is coupled to the system bus (113) and may include a basic input/output system (BIOS), which controls certain basic functions of the system (100).

FIG. 2 further depicts an I/O adapter (107) and a network adapter (106) coupled to the system bus (113). I/O adapter (107) may be a small computer system interface (SCSI) adapter that communicates with a hard disk (103) and/or tape storage drive (105) or any other similar component. I/O adapter (107), hard disk (103), and tape storage device (105) are collectively referred to herein as mass storage (104). A network adapter (106) interconnects bus (113) with an outside network (121) enabling the system (100) to communicate with other such systems. The video display (10) is connected to system bus (113) by display adaptor (112), which may include a graphics adapter to improve the performance of graphics intensive applications and a video controller. In one embodiment, adapters (107), (106), and (112) may be connected to one or more I/O busses that are connected to system bus (113) via an intermediate bus bridge (not shown). Suitable I/O buses for connecting peripheral devices such as hard disk controllers, network adapters, and graphics adapters typically include common protocols, such as the Peripheral Components Interface (PCI) bus. Additional input/output devices are shown as connected to system bus (113) via user interface adapter (108) and display adapter (112). A keyboard (109), mouse (110), and speaker (111) are all interconnected to bus (113) via user interface adapter (108).

Thus, as configured in FIG. 2, the system (100) includes processing means in the form of processors (101), storage means including system memory (250) and mass storage (104), input means such as keyboard (109) and mouse (110), and output means including speaker (111) and display (136). In one embodiment, a portion of system memory (250) and mass storage (104) collectively store an operating system such as the AIX® operating system from IBM Corporation to coordinate the functions of the various components shown in FIG. 2.

Also with reference to FIG. 2, the system (100) provides various forms of machine readable media (such as the system memory (250), ROM (102), hard disk (103), etc, . . . ) for storing and providing machine readable instructions. Exemplary instructions include production software (200). Further, the production software (200) may include machine readable instructions for performing face detection, speaker identification, lip synchronization, as well as instructions for digitizing information from other modalities. Further, the machine readable instructions provide for building an maintaining associations between the various modalities. Typically, the user interface (108) provides for collecting input for controlling aspects of the production software (200). In typical embodiments, the production software (200) is stored on the hard disk (103).

In typical embodiments, a video capture unit (105) provides footage (210). Other means to provide footage are via computer network such as an Ethernet network, peripheral device connected via IEEE-1394 (Firewire) or via a Universal Serial Bus (USB), or other means. The footage (210) may include raw video for production using the production software (200). The production software (200) makes use of the various resources of the system (100) to provide for an enhanced video output (220). In some embodiments, the enhanced video output (220) is stored on the hard disk (103).

Figure 3:
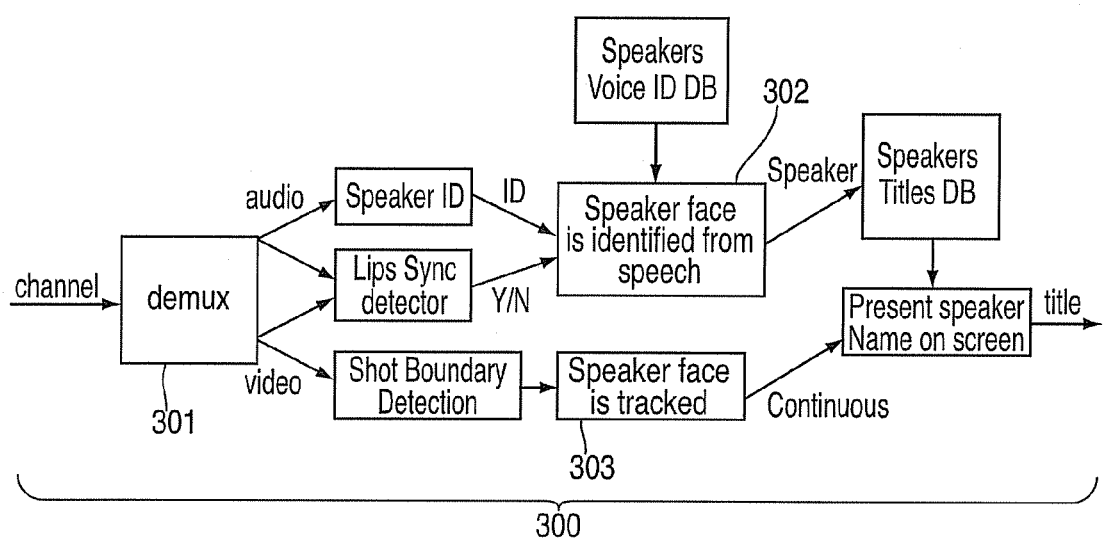
FIG. 3 illustrates one example of a method for determining a likeness.

FIG. 3 depicts aspects of one embodiment of a method for determining likeness information (300). In FIG. 3, a video channel feed is split (demultiplexed) into an audio signal and a video signal in a first step (301). The audio signal is processed by speech detector and speaker identification is provided in a second step (302). A speaker identification (ID) module of the production software (200) processes the audio signal in a moving window and produces voice signatures. A voice identification database includes voice signatures of people who are registered within the system, either by providing voice samples or by a third person identifying and labeling their voice in samples collected elsewhere. Given a new voice sample from the video, the Speaker ID module is capable of voice signature comparison (i.e., pattern recognition) with the voice identification database, producing the speaker ID, or a NONE label if it matches no person in the database. In some ambiguous cases the Speaker ID module may produce multiple ID candidates. Each such candidate may be associated with a confidence score. The module may test for and produce speaker ID output every predetermined period of time (say, 30 times per second), or whenever a speaker change is detected, or based on other schedules, internal and external triggers in a second step (302).

Facial tracking is performed in a third step (303) in parallel with speaker identification (more or less). Facial tracking output, in this embodiment, is passed to a Lip Synchronization Detector module of the production software (200). The lips synchronization detector (Lip Sync) receives both the visual input and the audible input channels and detects a spatio-temporal relationship between the voice and the motion in the video, in particular lip and mouth motion while a person voices words. When a person speaks and his voice is audible, it is trivial for a human observer to determine if the person whose face is seen on the screen is saying these words or not by watching his lips. However, if the audio signal is not timely synchronized with the video signal (but is ahead of the visual content or lagged behind), a human observer may get distracted and annoyed by the mismatch. Hence, the Lip Sync Detector module is typically provided with a capability to discern if a voice appears to be uncorrelated to the lips of the person shown on the screen. In such cases, the Lip Sync Detector module may produce a label of "VOICE-LIPS-MATCH" or "VOICE-LIPS-MISMATCH" every predetermined period of time, (say, 30 times per second), or whenever a speaker change is detected, a face change is detected, or based on other schedules, internal and external triggers. Stated another way, the Lip Sync Detector module provides for correlation of the two other modalities (video and audio) used in this embodiment. In this embodiment the Lips Sync detector is further used to determine if the audible voice corresponds to the face seen in the video or to other person, unseen in the video frame. Hence, in this embodiment, the lip sync detector determines periods of association between the audio and video modalities.

A Shot Boundary Detection module of the production software (200) detects major changes in the visual content of the scene. The output includes a segmentation of the visual content into temporal segments, each segment representing a continuous sequence of frames which contains no camera changes. In particular, the Shot Boundary Detection module may provide information regarding a start time for the presentation of a new face in the video as well as an end time (for example, when the video switches to a different face).

The output of Shot Boundary Detection module is entered into a face detection and tracking module. In each continuous shot, the face detection and tracking module is able to detect faces in the frame, determine their location(s) and track them from frame to frame (i.e., object tracking in video) while the person's head is moving, the camera's field of view is changing due to pan, tilt, zoom, the lights change, during partial occlusion etc. The output is a compact representation of the tracked face. In one embodiment, the data generated by the face detection and tracking module includes the begin frame number, the end frame number, the x-y coordinates of a bounding box around the face region in each of the frames and one representative image of the face extracted from this sequence of frames. It is recognized that some video frames may contain more than one face. In such cases, the output typically contains separate data for some or all of the faces visible in the video, with begin, end, and bounding boxes information for each of them. Face detection algorithms are known and therefore not discussed with greater specificity herein.

Using the speaker ID, the system provides for obtaining an appropriate label or labels from a database and associating them to the video signal to label the frame. The label is now associated with the face (likeness (5)) and therefore may apply to the entire shot duration, where the person is present, not only to the part when he speak and the lip sync is detected. Further aspects are presented in FIG. 4.

Figure 4:
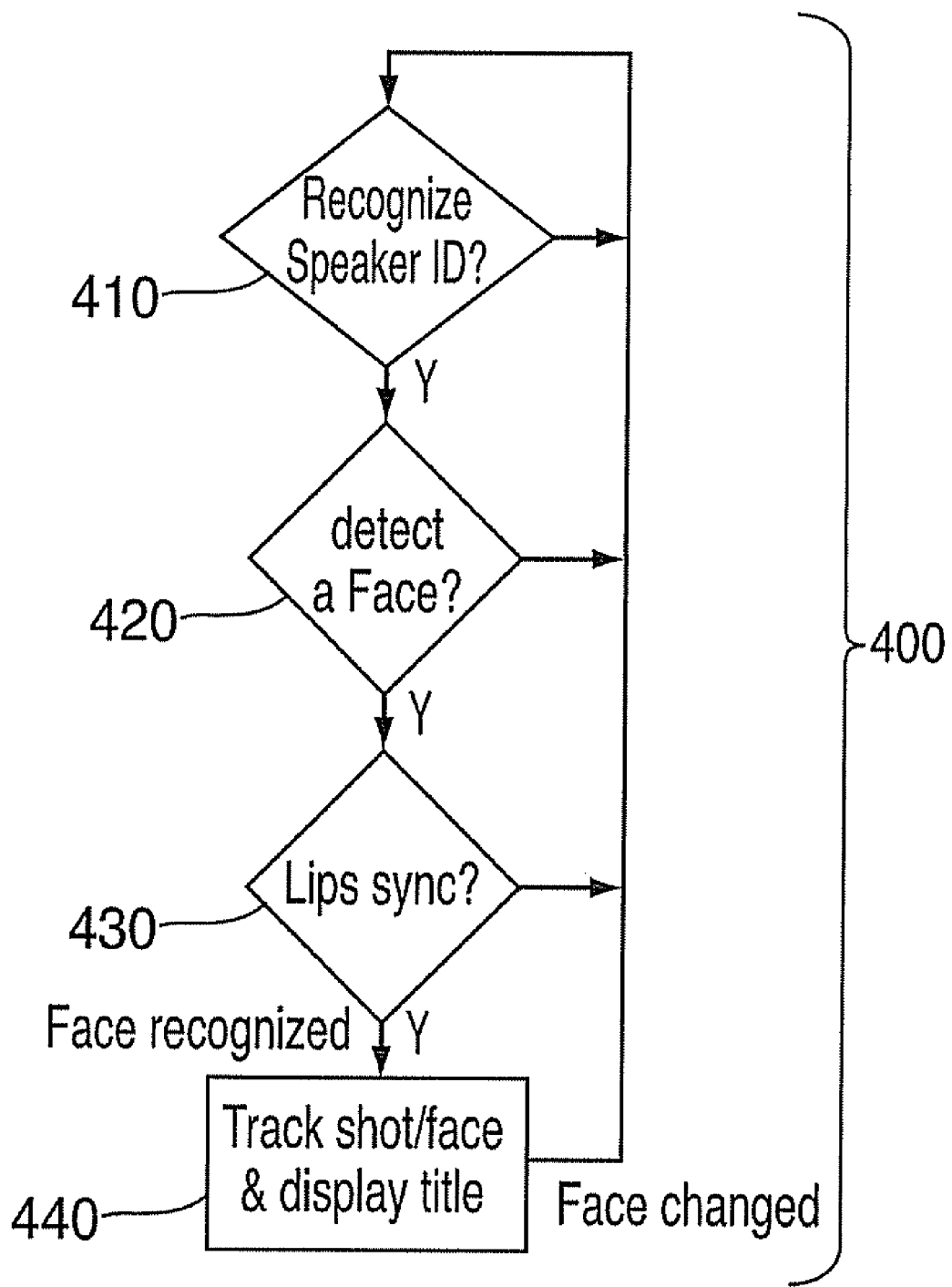
FIG. 4 illustrates exemplary aspects of building and maintaining an association.

FIG. 4 provides an exemplary method for maintaining an association (400). The method (400) tests for speaker identification (by voice pattern recognition) in a first step (410). If the speaker is recognized, the method calls for testing for face detection in a second step (420). If the second test is successful, the method determines if lip synchronization is adequate in a third step (430). If the lip sync is adequate, and the earlier tests (410, 420) are successful, the method provides a persistent association between the likeness (5) and may produce the semantic information (6).

Figure 5:
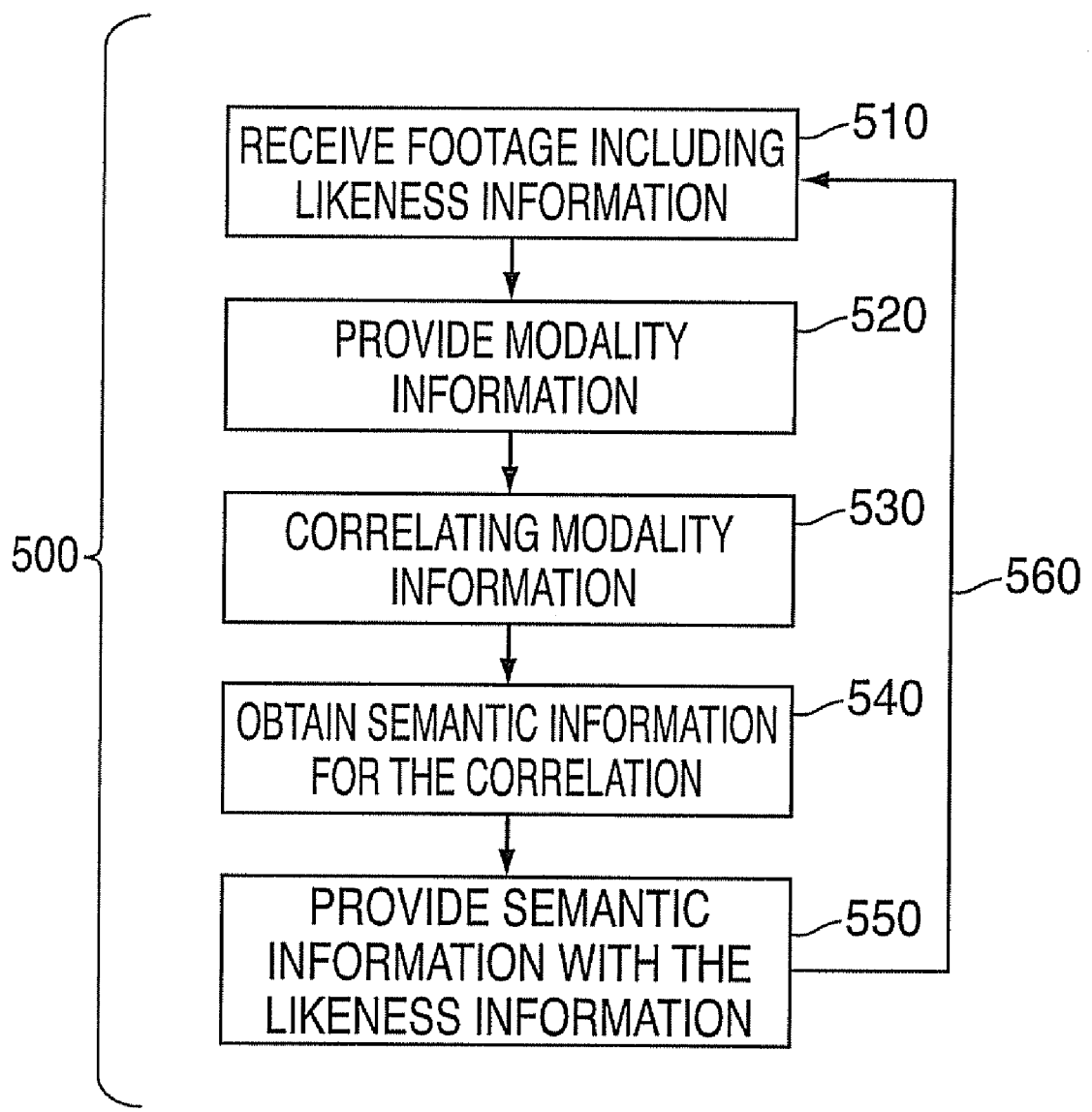
FIG. 5 provides a generalized embodiment for methods of providing semantic information.

In FIG. 5, aspects of another and more generalized exemplary embodiment of a method for providing enhanced video output (500) by associating semantic information (6) with likeness information (5) is provided.

Referring to FIG. 5, a method for providing enhanced video output (500) is provided. The method includes a first step (510) where footage (210) is received by the system (100). The system (100) demultiplexes likeness information in the footage (210) into modalities, and provides information for each of the modalities in a second step (520). Information from at least two of the various modalities is compared to determine a correlation in the likeness information in a third step (530). Once correlation has been established, semantic information (6) that correlates to the likeness (5) is obtained in a fourth step (540). The semantic information (6) is included with the likeness information to provide enhanced video output in a fifth step (550). The method for providing enhanced video output (500) repeats periodically in sixth step (560).

Of course, aspects of the various steps may be commingled, shared, exchanged, elaborated upon, added to and subtracted from. For example, correlating of the modality information may involve use of additional modality information (such as lip-sync) or involve other techniques (such as employing a correlation algorithm for determining synchronization). In some embodiments, correlation is realized through referencing of external resources (e.g., a database) for each of the modalities, while use of additional modality information is not required. Providing (association of) the semantic information (6) may persist for longer or shorter periods than the correlation. In short, one skilled in the art will recognize that a variety of techniques may be employed.

Figure 6:
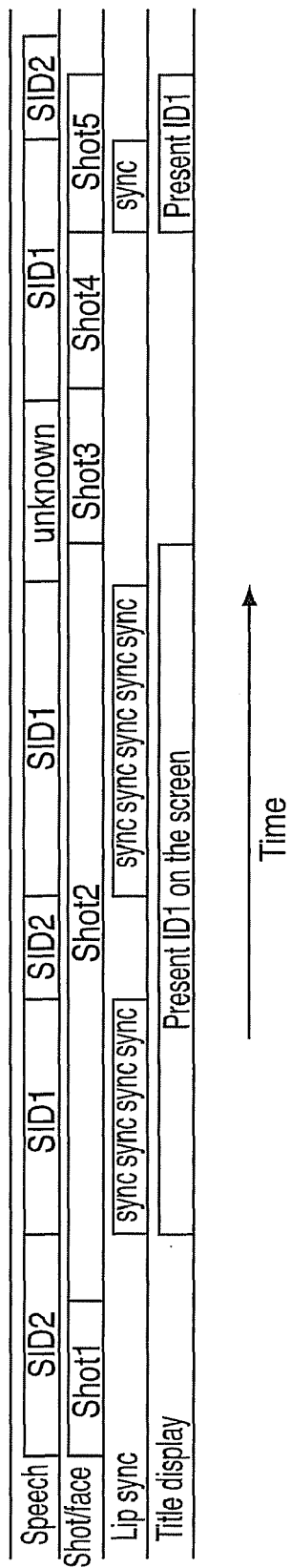
FIG. 6 depicts provides temporal relationships between information modalities and display of semantic information.

In FIG. 6, an exemplary timeline (500) depicts exemplary aspects regarding persistent associations. Recall the Speaker Identification module output the Speaker ID of the current speaker based on analysis of the audio against a database of known (enrolled) speakers. In the example of FIG. 6, two recognized speakers are provided. These speakers are identified as SID1 and SID2, and one segment where the speaker is unknown to the system. The face and shot detection module segments the video into continuous face segments. Whenever the shot changes or the face changes (due to camera pan, for example) it starts a new segment. The lips sync detector produces sync/no-sync labels, depending on whether or not the audible voice is synchronized with the lips of the visible face. When such an occasion occurs, the detected speaker ID can be associated with the visible face (i.e., likeness (5)). From that point in time, the name of the identified person (i.e., semantic information (6)) is displayed and tracking of the face occurs, even if the speech changes to another speaker. This is shown in the example, where the title display segment continue while the speaker changes. In a real-time title display scenario, the title will show SID1 for the duration starting when lip sync was first detected and ending when the shot ends and the face tracking is lost. In an off-line analysis we can also track the face backwards in the video, to the beginning of shot 2, and start to display the title from this earlier point.

Include face recognition: another thing that can be done is on an ongoing basis to combine the speaker ID n-best and face-ID n-best to make the ID decision. As a safeguard to make sure that face matches the voice, the lip-sync check is used. So for every video frame/packet, facial recognition and speaker-id is performed. The facial/speaker ID combination is used only if a determination is made that the combination includes adequate lip-synchronization.

Tracking may be performed in one or more modalities. Association between modalities may be obtained during periods of detected correlation between the modalities. When multiple modalities are used for tracking, the associated information may be carried on as long as there is continuation of tracking in at least one modality at each period of time. For example, voice identification may fail to identify the speaker for some period of time (e.g., while there is background noise) however voice tracking may be used to ensure that it is still the same speaker as before—that is, tracking of the speaker's voice.

In more general terms, this disclosure presents a method to propagate ID-s associated with objects along time, where the identification is made using at least one modality, then association is made between this modality and second modality for at least one period of time, and then tracking of identity is made in the said second modality for another period of time. Instead of tracking along time it can be tracked along other dimensions, such as space, geographical or spatio-temporal location.

Although disclosed in terms of human subjects, one skilled in the art will recognize that such teachings are merely illustrative and not limiting of the teachings herein.

In other embodiments, a stream is used instead of two phases. That is, the method does not require the lipsync to be part of "tracking." Working on a continuous stream, and instead of having two phases (speaker ID followed by lip-sync tracking), a combined (speaker+lipsync) system can be employed. For example, face identification by speech can be made when both speaker and lip-sync are detected. However, the face label can hold as long as the face tracker keeps tracking. On the other hand, if this is not a live stream but an offline process, one could also track the face backwards in time in the video, and associated semantic information may be deployed at earlier part in the video, before the person speaks. Similarly, the speaker ID may be tracked as long as there is no speaker change, even if speaker identification is lost in some parts of the speech.

The information associated with the person may be used for purposes other than enhancing the video. For example, it may be used to create metadata for the video, associate person's identification and other semantic with particular video segment, or with the entire story in which it is part of. The information may be stored in a database or streamed with the video, or provided in a separate communication channel, for example over the Internet. This semantic information (6) may be used to index the video for search and retrieval purposes, to compute statistics such as air time given to democratic and republican politicians during election campaigns etc.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A computer program product comprising machine readable instructions stored on machine readable media, the instructions for providing enhanced video output by:
   receiving footage comprising likeness information in a plurality of modalities;
   demultiplexing the plurality of modalities to provide information for each modality;
   identifying a likeness using information from a first modality;
   comparing the likeness with information from another modality and determining a correlation between the likeness and the information from another modality;
   tracking the likeness using information from one of the first modality and the another modality;
   obtaining semantic information for association with the likeness; and
   associating the semantic information with the likeness for providing the enhanced video output,
   wherein the associating persists for a period of time that is one of longer and shorter than the correlation.

2. The computer program product of claim 1, wherein the plurality of modalities comprises at least one of a video modality, an audio modality, and a lip synchronization modality.

3. The computer program product of claim 1, wherein the semantic information comprises at least one of personal information, a name, a player number, a political party and an employer identity.

4. The computer program product of claim 1, wherein the likeness comprises appearance information comprising at least one of an auditory appearance and a visual appearance.

5. The computer program product of claim 1, wherein at least one of the demultiplexing and the comparing comprises employing a speaker identification module comprising instructions for providing a speaker identification.

6. The computer program product of claim 1, wherein tracking comprises employing a face detection and tracking module comprising instructions for providing at least one of face detection, facial recognition, face location determination, object tracking and image tracking.

7. The computer program product of claim 1, wherein determining a correlation comprises employing a lip-sync detector module comprising instructions for detecting a spatio-temporal relationship between voice and motion in the footage.

8. A system for providing enhanced video output, the system comprising:
   resources for receiving footage, and for implementing a computer program product comprising machine readable instructions stored on machine readable media, the instructions for providing enhanced video output by:
   receiving footage comprising likeness information in a plurality of modalities;
   demultiplexing the plurality of modalities to provide information for each modality;
   identifying a likeness using information from a first modality;
   comparing the likeness with information from another modality and determining a correlation between the likeness and the information from another modality;
   tracking the likeness using information from one of the first modality and the another modality;
   obtaining semantic information for association with the likeness; and
   associating the semantic information with the likeness for providing the enhanced video output,
   wherein the associating persists for a period of time that is one of longer and shorter than the correlation.

* * * * *